No. 717,948. PATENTED JAN. 6, 1903.
M. TOLTZ & A. LIPSCHUTZ.
SAFETY MEANS FOR DISTRIBUTING ACETYLENE GAS.
APPLICATION FILED JULY 5, 1902.
NO MODEL.
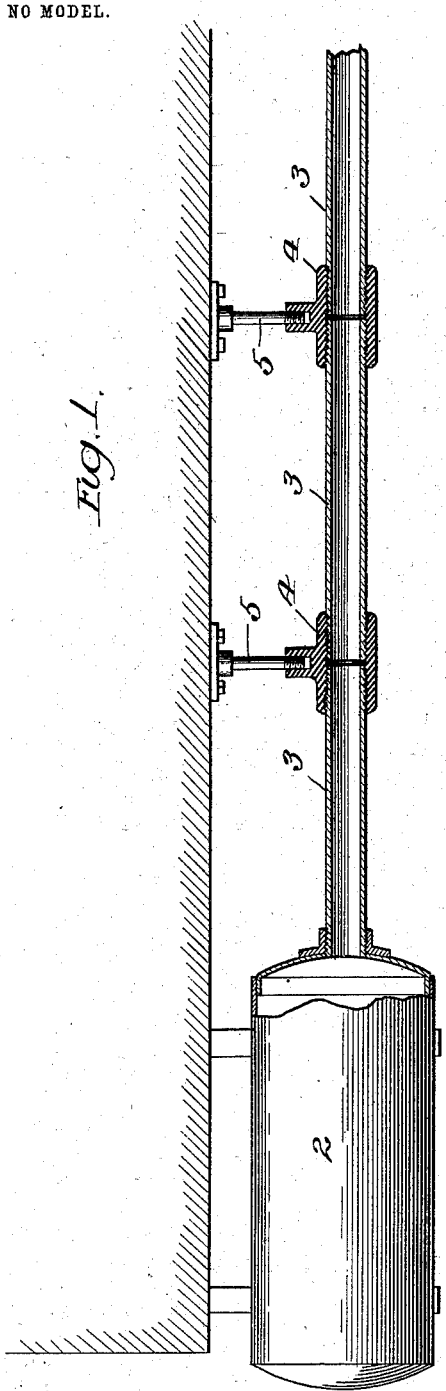
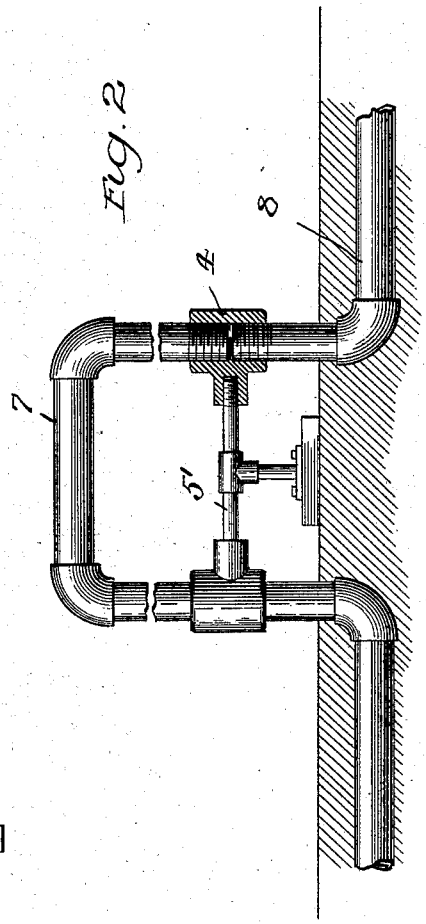
Witnesses:
Inventors
Max Toltz
and Arthur Lipschutz
By
Atty.

UNITED STATES PATENT OFFICE.

MAX TOLTZ, OF ST. PAUL, MINNESOTA, AND ARTHUR LIPSCHUTZ, OF ST. LOUIS, MISSOURI.

SAFETY MEANS FOR DISTRIBUTING ACETYLENE GAS.

SPECIFICATION forming part of Letters Patent No. 717,948, dated January 6, 1903.

Application filed July 5, 1902. Serial No. 114,361. (No model.)

*To all whom it may concern:*

Be it known that we, MAX TOLTZ, of St. Paul, Ramsey county, Minnesota, and ARTHUR LIPSCHUTZ, of St. Louis, Missouri, have invented certain new and useful Improvements in Safety Means for Distributing Acetylene Gas, of which the following is a specification.

This invention relates to means for safely storing and distributing such gases as acetylene gas, and has particular reference to the employment of acetylene gas for train lighting.

The dissociation-point of acetylene gas is so low—approximately 1,432°—that it is unsafe to use acetylene gas, either in tanks or in pipes connected with even a distant source of acetylene gas, in places where there is any danger of conflagration unless means are provided to liberate the body of gas automatically when any part of the system is attacked by heat. If any portion of an iron or steel pipe or reservoir containing acetylene gas is heated above the dissociation-point of the gas, a violent explosion will occur, and this explosion will be communicated to every part of the gas system. Therefore the gas-pipes in trains or coaches and in similarly-exposed places must be thoroughly protected against heat or must be fusible or breakable at a low temperature to freely release the gas. A fusible gas-pipe intended to melt, and thus open the pipe and permit free escape and combustion of the gas, sometimes fails to perform its office, inasmuch as the pipe will sometimes collapse and close when melted, thus effectually preventing the escape of the gas.

The object of our invention is to enable the employment and distribution of acetylene gas under pressure without danger of explosion by reason of the heating of the gas pipes or fixtures; and the particular object of this invention is to improve the construction and arrangement of the safety-sections in acetylene-gas pipes to the end that when subjected to heat the joints of the pipe will break and sections of the pipe will drop, so that the gas may freely escape.

To this end our invention consists in an acetylene-gas pipe or duct comprising two or more sections of pipes that are substantially non-fusible in combination with fusible joints or couplings connecting the sections and adapted when heated to melt or fuse and free one or more of the non-fusible sections, so that same will drop or break joints and permit the escape of the gas; and our invention further consists in an acetylene-gas pipe comprising sections of non-fusible pipe in combination with a fusible coupling or joint for said sections and a non-fusible support for said fusible joint.

Our invention will be more readily understood by reference to the accompanying drawings, forming a part of this specification, and in which—

Figure 1 illustrates a safety gas-distributing means embodying our invention as employed on railway-coaches; and Fig. 2 illustrates a modification thereof, showing the manner of protecting an exposed gas main or pipe in a street or house.

In Fig. 1 of the drawings, 2 represents a gas tank or reservoir as it usually appears suspended beneath a railway-coach and in which gas is stored at a pressure of several atmospheres. The high-pressure pipe extending from the tank in practice leads to the reducing-valve, (not shown,) from which the burner-pipes are supplied with gas at a low pressure. The danger lies between the tank and the reducing-valve, where the pressure of gas is high. The high-pressure pipe is made in two or more sections 3 3 3. These sections are of non-fusible material, such as iron, which does not fuse at a temperature as low as that of acetylene-gas dissociation. The ends of the section 3 are placed close together and are joined by the sleeves, joints, or couplings 4 4, which make gas-tight joints. These couplings are made of a material, such as lead, that will melt quickly at a temperature of about 800°. They are supported by hangers 5 5, which are of non-fusible material, such as iron, and which normally support the pipe and serve to prevent any bending thereof which might loosen the comparatively soft metal joint. If a railroad-train is wrecked and takes fire or in case a conflagration occurs near the coach, the fusible joint or joints 4 4 will quickly melt, whereupon the joint between the iron sections will be opened or a whole section will drop, and thus allow the gas to escape freely and burn to avert an explosion. When the fusible joint melts, it is evident that the connections between the iron pipe and the iron hangers will be broken, and usually the middle section 3 will drop upon the ground, in which case the entire cross-section of the pipe is opened for the escape of the gas.

Where acetylene gas is supplied to buildings from street-mains or from generators situated at a distance from the buildings, we provide safety-sections at all points where the acetylene-gas pipes are exposed. Such a safety-section is illustrated in Fig. 2, wherein it will be seen that the loop 7 is joined to the ends of the gas-pipe 8 by fusible sections 4, that are supported upon the non-fusible hanger 5'. It is obvious that when heat is applied to the fusible joints 4 and the same are melted the loop will drop down out of the way and the gas will rush freely from the pipe 8 into the open air, thereby preventing the dissociation of the acetylene gas and the communication of the explosion to all parts of the connected pipe system and gas reservoirs.

Numerous modifications may be made in our invention, and we do not confine the same to the specific construction herein shown and described.

Having thus described our invention, we claim as new and desire to secure by Letters Patent—

1. The herein-described safety gas-distributing means for acetylene gas that consists in a gas duct or pipe comprising two or more sections of non-fusible pipe, in combination with fusible couplings or joints for said sections, substantially as described.

2. The herein-described safety gas-distributing means for acetylene gas that consists in a gas duct or pipe comprising two or more sections of non-fusible pipe, in combination with fusible couplings or joints for said sections and non-fusible supports for said couplings, substantially as described.

3. The herein-described gas-distributing means that consists in a gas duct or pipe composed of several sections of non-fusible pipe, in combination with a fusible joint for said sections comprising a suitably-supported sleeve or coupling wherein the ends of said non-fusible sections are secured, substantially as described.

4. The herein-described safety gas-distributing means for acetylene gas, that consists in the non-fusible sections 3, 3, in combination with the fusible joint or coupling 4 for said sections and the non-fusible support 5 having a fusible connection with said part 4, substantially as described.

5. The herein-described safety gas-distributing means for acetylene gas that consists in a duct or pipe having joints that are fusible at a lower temperature than said duct or pipe, substantially as described.

6. The herein-described safety gas-distributing means for acetylene gas that consists in a duct or pipe having joints fusible at a lower temperature than the fusing-point of said duct or pipe and lower than the temperature at which acetylene gas will dissociate, substantially as described.

In testimony whereof I have hereunto set my hand, in the presence of two witnesses, this 6th day of June, 1902.

MAX TOLTZ.

In presence of—
C. M. TUBBY,
W. R. WOOD.

In testimony whereof I have hereunto set my hand, in the presence of two witnesses, this 10th day of June, 1902.

ARTHUR LIPSCHUTZ.

In presence of—
CHAS. WHIDDLE,
WM. STEVENSON.